(12) United States Patent
Turetken et al.

(10) Patent No.: US 9,794,525 B2
(45) Date of Patent: Oct. 17, 2017

(54) SYSTEMS AND METHODS FOR TRACKING INTERACTING OBJECTS

(71) Applicant: ECOLE POLYTECHNIQUE FEDERALE DE LAUSANNE (EPFL), Lausanne (CH)

(72) Inventors: Engin Turetken, Ecublens (CH); Pascal Fua, Vaux-sur-Morges (CH); Francois Fleuret, Yverdon (CH); Xinchao Wang, Ecublens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 213 days.

(21) Appl. No.: 14/666,906

(22) Filed: Mar. 24, 2015

(65) Prior Publication Data

US 2015/0281655 A1 Oct. 1, 2015

Related U.S. Application Data

(60) Provisional application No. 61/969,882, filed on Mar. 25, 2014.

(51) Int. Cl.
*H04N 7/18* (2006.01)
*G06K 9/00* (2006.01)
(Continued)

(52) U.S. Cl.
CPC ......... *H04N 7/181* (2013.01); *G06K 9/00771* (2013.01); *G06K 9/6296* (2013.01);
(Continued)

(58) Field of Classification Search
None
See application file for complete search history.

(56) References Cited

U.S. PATENT DOCUMENTS 7,526,100 B1 * 4/2009 Hartman .............. G06K 9/3241
382/103
8,285,055 B1 * 10/2012 Barnes .................... G06T 7/337
382/108

(Continued)

OTHER PUBLICATIONS

Anurag Mittal et al., "M2Tracker: A Multi-View Approach to Segmenting and Tracking People in a Cluttered Scene", International Journal of Computer Vision, vol. 51, No. 3, pp. 189-203, Feb. 2003.

(Continued)

*Primary Examiner* — Tsung-Yin Tsai
(74) *Attorney, Agent, or Firm* — DLA Piper LLP (US)

(57) ABSTRACT

Systems and methods for tracking interacting objects may acquire, with a sensor, and two or more images associated with two or more time instances. A processor may generate image data from the two or more images. The processor may apply an extended Probability Occupancy Map (POM) algorithm to the image data to obtain probability of occupancy for a container class of potentially interacting objects, probability of occupancy for a containee class of the potentially interacting objects, and a size relationship of the potentially interacting objects, over a set of discrete locations on a ground plane for each time instance. The processor may estimate trajectories of an object belonging to each of the two classes by determining a solution of a tracking model on the basis of the occupancy probabilities and a set of rules describing the interaction between objects of different or the same classes.

16 Claims, 11 Drawing Sheets

(9 of 11 Drawing Sheet(s) Filed in Color)

(51) Int. Cl.
*G06K 9/62* (2006.01)
*G06T 7/277* (2017.01)
*G06K 9/32* (2006.01)

(52) U.S. Cl.
CPC ...... *G06T 7/277* (2017.01); *G06K 2009/3291* (2013.01); *G06T 2207/10016* (2013.01); *G06T 2207/20076* (2013.01); *G06T 2207/30232* (2013.01); *G06T 2207/30236* (2013.01); *G06T 2207/30241* (2013.01)

(56) References Cited

U.S. PATENT DOCUMENTS

| | | | | |
|---|---|---|---|---|
| 2005/0104727 A1* | 5/2005 | Han | ........... | G06K 9/00335 340/541 |
| 2005/0104962 A1* | 5/2005 | Han | ........... | G06K 9/00335 348/143 |
| 2005/0105765 A1* | 5/2005 | Han | ........... | G06K 9/00295 382/100 |
| 2008/0100473 A1* | 5/2008 | Gao | ........... | G08G 1/04 340/937 |
| 2008/0118106 A1* | 5/2008 | Kilambi | ........... | G06M 11/00 382/103 |
| 2009/0296989 A1* | 12/2009 | Ramesh | ........... | G06K 9/00771 382/103 |
| 2011/0279685 A1* | 11/2011 | Alahi | ........... | G06K 9/00624 348/187 |
| 2013/0163874 A1* | 6/2013 | Shechtman | ........... | G06K 9/6211 382/190 |
| 2015/0294158 A1* | 10/2015 | Collins | ........... | G06K 9/00711 382/103 |

OTHER PUBLICATIONS

Francois Fleuret et al., "Multi-Camera People Tracking with a Probabilistic Occupancy Map", IEEE Transactions on Pattern Analysis and Machine Intelligence, vol. 30, No. 2, pp. 267-282, Feb. 2008.

Hao Jiang et al., "A Linear Programming Approach for Multiple Object Tracking", IEEE Conference on Computer Vision and Pattern Recognition 2007 (CVPR'07), pp. 1-8, Jun. 17-22, 2007.

Jerome Berclaz et al., "Multiple Object Tracking Using K-Shortest Paths Optimization", IEEE Transactions on Pattern Analysis and Machine Intelligence, vol. 33, pp. 1806-1819, Sep. 2011.

Bo Yang et al., "Multi-Target Tracking by Online Learning of Non-Linear Motion Patterns and Robust Appearance Models", IEEE Conference on Computer Vision and Pattern Recognition 2012 (CVPR), pp. 1918-1925, Jun. 16-21, 2012.

Tobias Baumgartner et al., "Tracking People and Their Objects", IEEE Conference on Computer Vision and Pattern Recognition 2013 (CVPR), pp. 3658-3665, Jun. 23-28, 2013.

Kevin Smith et al., "Using Particles to Track Varying Numbers of Interacting People", IEEE Conference on Computer Vision and Pattern Recognition 2005 (CVPR), pp. 962-969 (vol. 1), Jun. 20-25, 2005.

Bo Yang et al., "An Online Learned CRF Model for Multi-Target Tracking", IEEE Conference on Computer Vision and Pattern Recognition 2012 (CVPR), pp. 2034-2041, Jun. 16-21, 2012.

Wongun Choi et al., "A Unified Framework for Multi-Target Tracking and Collective Activity Recognition", ECCV 2012, Part IV, LNCS, 7575, pp. 215-230 (2012).

Patrick Lucey et al., "Representing and Discovering Adversarial Team Behaviors Using Player Roles", IEEE Conference on Computer Vision and Pattern Recognition 2013 (CVPR), pp. 2706-2713, Jun. 23-28, 2013.

Hamed Pirsiavash et al., "Globally-Optimal Greedy Algorithms for Tracking in Video: Data, Metrics, and Protocol", IEEE Conference on Computer Vision and Pattern Recognition 2011 (CVPR), pp. 1201-1208, Jun. 20-25, 2011.

Rangachar Kasturi et al., "Framework for Performance Evaluation of Face, Text, and Vehicle Detection and Tracking in Video: Data, Metrics, and Protocol", IEEE Transactions on Pattern Analysis and Machine Intelligence, vol. 31, No. 2, pp. 319-336, Feb. 2009.

\* cited by examiner (a)

(b)

(a)

(b)

(b) PETS2006

SYSTEMS AND METHODS FOR TRACKING INTERACTING OBJECTS

CROSS-REFERENCE TO RELATED APPLICATION

This application is based on and claims priority from U.S. Provisional Application No. 61/969,882, filed Mar. 25, 2014, the entirety of which is incorporated by reference herein.

BACKGROUND

Tracking people or objects over time can be achieved by first running detectors that compute probabilities of presence in individual images and then linking high probabilities of detections into complete trajectories. This can be done recursively, using dynamic programming, or using Linear Programming.

Most of these approaches focus on one kind of object, such as pedestrians or cars, and only model simple interactions, such as the fact that different instances may repel each other to avoid bumping into each other or synchronize their motions to move in groups.

Multiple target tracking has a long tradition, going back many years for applications such as radar tracking. These early approaches to data association usually relied on gating and Kalman filtering, which have later made their way into our community.

Because of their recursive nature, they are prone to errors that are difficult to recover from by using a post processing step. Particle-based approaches partially address this issue by simultaneously exploring multiple hypotheses. However, they can handle only relatively small batches of temporal frames without their state space becoming unmanageably large, and often require careful parameter setting to converge.

In recent years, techniques that optimize a global objective function over many frames have emerged as powerful alternatives. They rely on Conditional Random Fields, belief Propagation, Dynamic Programming, or Linear Programming Among the latter, some operate on graphs whose nodes can either be all the spatial locations of potential people presence, or only those where a detector has fired.

On average, these more global techniques are more robust than the earlier ones but, especially among those that focus on tracking people, do not handle complex interactions between people and other scene objects. In some techniques, the trajectories of people are assumed to be given. In others, group behavior is considered during the tracking process by including priors that account for the fact that people tend to avoid hitting each other and sometimes walk in groups.

In some techniques, there is also a mechanism for guessing where entrances and exits may be by recording where tracklets start and end. However, this is very different from having objects that may move, thereby allowing objects of a different nature to appear or disappear at varying locations. In some techniques, person-to-person and person-to-object interactions are exploited to more reliably track all of them. This approach relies on a Bayesian Network model to enforce frame-to-frame temporal coherence, and on training data to learn object types and appearances. Furthermore, this approach requires the objects to be at least occasionally visible during the interaction.

BRIEF DESCRIPTION OF THE FIGURES

The patent or application file contains at least one drawing executed in color. Copies of this patent or patent application publication with color drawing(s) will be provided by the Office upon request and payment of the necessary fee.

The present invention will be better understood thanks to the attached figures in which.

DETAILED DESCRIPTION OF SEVERAL EMBODIMENTS

Systems and methods described herein may provide a global optimization framework that does not require training and can handle objects that remain invisible during extended periods of time, such as a person inside a car or a ball being carried and hidden by a player.

A Mixed Integer Programming framework may be used to model the complex relationship between the presence of objects of a certain kind and the appearance or disappearance of objects of another. For example, when tracking people and cars on a parking lot, it may be expressed that people may only appear or disappear either at the edge of the field of view or as they enter or exit cars that have stopped. Similarly, when attempting to check if a bag has been abandoned in a public place where people can be tracked, it may be expressed that this can only happen at locations through which somebody has been the instant before. The same goes for the ball during a basketball match; it is usually easiest to detect when it has left the hands of one player and before it has been caught by another.

Tracking Systems

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). Connections between computers may use any protocols, including connection-oriented protocols such as TCP or connectionless protocols such as UDP. Any connection through which at least two computers may exchange data can be the basis of a network.

Figure 1:
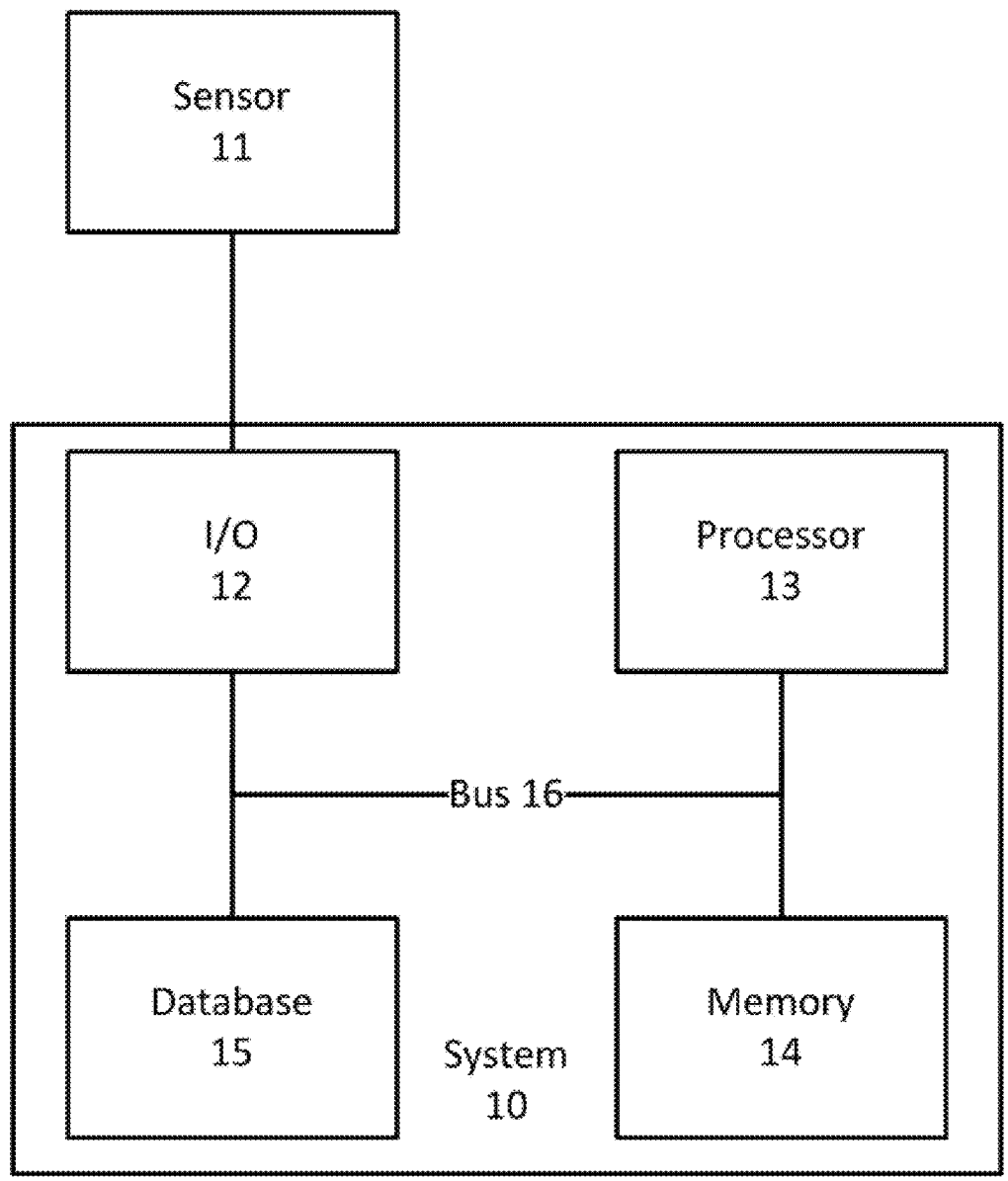
FIG. 1 illustrates a tracking system according to an embodiment of the invention.

FIG. 1 illustrates a tracking system 10 according to an embodiment of the invention. At least one sensor 11 (e.g., a camera or other image sensor) may be used to capture still images and/or video. The system 10 may also include at least one processor 13, at least one memory 14, at least one database 15 (e.g., a hard drive or other storage device), and/or at least one I/O device 12, which may be connected to one another via at least one bus 16. In some embodiments, one or more of these components may be connected wirelessly or in some other way. The sensor 11 may communicate with the I/O device 12. For example, the I/O device 12 may include a video card, and the sensor 11 may connect to the video card via a wired connection. In another example, the I/O device 12 may include a network card connected to a wired or wireless network, and the sensor 11 may communicate with the network card via the network. The processor 13 and/or memory 14 may be used to perform various processing functions related to object tracking described in greater detail below.

Enforcing the fact that one object can only appear or disappear at locations where another is or has been can be done by imposing linear flow constraints. This results in a Mixed Integer Programming problem, for which the global optimum can be found using standard optimization packages. Since different object types are handled in symmetric fashion, the presence of one can be evidence for the appearance of the other and vice-versa.

Figure 2A:
FIGS. 2a to 2c illustrate an object tracking example according to an embodiment of the invention.
Figure 2B:
Figure 2C:

For example, FIGS. 2a to 2c illustrate an object tracking example according to an embodiment of the invention. Images are collected by the sensor 11 and sent to the processor 13 via the I/O device 12. In FIG. 2a, thresholding the detector scores for cars and people produces only one strong detection in this specific frame of a complete video sequence. In FIG. 2b, linking people detections across frames reveals the presence of an additional person. In FIG. 2c, the additional person constitutes evidence for the presence of a car he will get in. This allows the algorithm used by the processor 13 to find the car as well in spite of the car detection failure. Because people and cars may be treated symetrically, the situation could have been reversed: The car could have been unambiguously detected and have served as evidence for the appearance of a person stepping out of it. This would not be the case if cars were tracked first and people potentially coming out of them next, for example.

FIGS. 2a to 2c depict a case where simply thresholding the response of the car detector leads to a car being missed. However, because people are properly detected appearing from a location in the middle of the parking lot, the algorithm used by the processor 13 eventually concludes correctly that there must have been a car from which they emerged. So, in this scenario, not only does the presence of a vehicle "allow" the appearance of pedestrians but the appearance of pedestrians is treated as evidence for the presence of a vehicle.

This approach may be much more general than what is done in approaches wherein the appearance of people is used to infer the possible presence of a static entrance. This approach may also go beyond recent work on interaction between people and objects. Due to the global nature of the optimization and the generality of the constraints, the system 10 may deal with objects that may be completely hidden during large portions of the interaction and may not require any training data.

The system 10 may employ a mathematically principled and computationally feasible approach to accounting for the relationship between flows representing the motions of different object types, especially with regard to their container/containee relationship and appearance/disappearance. The container class refers to the class of objects that can contain the objects from the other class in the interaction relationship; and containee class refers to the class of objects than can be contained. For example, the container may be a bigger object, and the containee may be a smaller object in a relationship. Examples described herein include the case of people entering and leaving cars, bags being carried and dropped, and balls beings passed from one player to the next in a ball-game.

Tracking Methods

In this section, we first formulate the problem of simultaneously tracking multiple instances of two kinds of target objects, one of which can contain the other, as a constrained Bayesian inference problem. Here, we take "contain" to mean either fully enclosing the object, as the car does to its occupants, or simply being in possession of and partially hiding it, as a basketball player holding the ball. We then discuss these constraints in more details and show that they result in a Mixed Integer Program (MIP) on a large graph, which we solve by first pruning the graph and then using a standard optimizer. The methods described in this section may be performed by the processor 13 and/or other system 10 elements on image data captured by a sensor 11.

Bayesian Inference

Given a set of at least two images producing image data from one or more sensors 11 (e.g., cameras with overlapping fields of view), we will refer to the set of images acquired simultaneously as a temporal frame. Let the number of time instants be T and the corresponding set of temporal frames $I=(I^1, \ldots, I^T)$.

Assuming the position of target objects to be completely defined by their ground plane location, the processor 13 may discretize the area of interest into a grid of L square grid locations, which we will refer to as spatial locations. Within each one, we assume that a target object can be in any one of O poses. In this work, we define this pose space to be the set of regularly spaced object orientations on the ground of the area of interest.

For any pair k of location l and orientation o, let $N(k) \subset \{1, LO\}$ denote the neighborhood of k, that is, the locations and orientations an object located at 1 and oriented at o at time t can reach at time t+1. Let also l(k) and o(k) respectively denote the location and orientation of k.

The processor 13 may build a directed acyclic graph $G=(V;E)$ on the locations and orientations, where the vertices $V=\{v_k^t\}$ represent pairs of orientation angles and locations at each time instant, and the edges $E=\{e_{kj}^t\}$ represent allowable transitions between them. Here, we use the word transition to refer to an object's movement between two frames, in particular for modeling a transition between a first image defining a first location with a first orientation of an object, and a second image defining a second location with a second orientation of the object, to produce a flow variable.

More specifically, an edge $e_{kj}^t \in E$ connects vertices $\{v_k^t\}$ and $\{v_k^{t+1}\}$ if and only if $j \in N(k)$. The number of vertices and edges are therefore roughly equal to O L T and N (:)O LT, respectively.

Recall that we are dealing with two kinds of objects, one of which can contain the other. Let $X=\{X_k^t\}$ be the vector of binary random variables denoting whether location l(k) is occupied at time t by a containee type object with orientation o(k), and $x=\{x_k^t\}$ a realization of it, indicating presence or absence of a containee object.

Similarly, let $Y=\{Y_k^t\}$ and $y=\{Y_k^t\}$ respectively be the random occupancy vector and its realization for the container object class.

As will be discussed in greater detail below, the processor 13 may estimate image-based probabilities of occupancy for two different classes of potentially interacting objects, $\rho_k^t = P(X_k^t=1|I^t)$ and $\beta_k^t \; 0 \; P(Y_k^t=1|I^t)$, produced by the processor 13 with the POM (Probabilistic Occupancy Map) algorithm from the image data, that a containee or container object is present at grid location l(k), with orientation o(k), and at time t in such a way that their product over all k and t is a good estimate of the joint probability P(X=x; Y=y|I). Among other things, the processor 13 may accomplish this by accounting for objects potentially occluding each other.

Given the graph G, and the probabilities $\rho_k^t$ and $\beta_k^t$, the processor 13 may look for the optimal set of paths as the solution of $$(x, y)^* = \underset{(x,y) \in \mathcal{F}}{\operatorname{argmax}} P(X = x, Y = y \mid I) \quad (1)$$

$$\approx \underset{(x,y) \in \mathcal{F}}{\operatorname{argmax}} \prod_{t,k} P(X_k^t = x_k^t \mid I^t) P(Y_k^t = y_k^t \mid I^t) \quad (2)$$

$$= \underset{(x,y) \in \mathcal{F}}{\operatorname{argmax}} \sum_{t,k} \log P(X_k^t = x_k^t \mid I^t) + \log P(Y_k^t = y_k^t \mid I^t) \quad (3)$$

$$= \underset{(x,y) \in \mathcal{F}}{\operatorname{argmax}} \sum_{t,k} x_k^t \log \rho_k^t + (1 - x_k^t) \log(1 - \rho_k^t) + \\ y_k^t \log \beta_k^t + (1 - y_k^t) \log(1 - \beta_k^t)$$

$$= \underset{(x,y) \in \mathcal{F}}{\operatorname{argmax}} \sum_{t,k} \log\left(\frac{\rho_k^t}{1 - \rho_k^t}\right) x_k^t + \log\left(\frac{\beta_k^t}{1 - \beta_k^t}\right) y_k^t \quad (4)$$

where T stands for the set of all feasible solutions as defined in the following section.

Eq. 2 comes from the above-mentioned property that the product of image-based probabilities is close to true posterior of Eq. 1, which will be discussed in more details in §4, and from the assumption that all feasible transitions from time t to time t+1 are equally likely. Eq. 3 is true because both $x_k^t$ and $y_k^t$ are binary variables. Finally, Eq. 4 is obtained by dropping constant terms that do not depend on $x_k^t$ or $y_k^t$. The resulting objective function is therefore a linear combination of these variables.

However, not all assignments of these variables may give rise to a plausible tracking result in some cases. Therefore, the processor 13 may perform the optimization of Eq. 4 subject to a set of constraints defined by T, which we describe next.

Flow Constraints

To express all the constraints inherent to the tracking problem, the processor 13 may use two additional sets of binary indicator variables that describe the flow of objects between pairs of discrete spatial locations and orientations at consecutive time instants. More specifically, we introduce the flow variables $f_{kj}^t$ and $g_{kj}^t$, which stand respectively for the number of containee and container type objects moving from orientation o(k) and location l(k) at time t to orientation o(j) and location l(j) at time t+1.

In the following, in addition to the integrality constraints on the flow variables, we define six sets of constraints to obtain structurally plausible solutions.

Upper Bound on Flows: the processor 13 may set an upper-bound of one to the sum of all incoming flows to a given location because it cannot be simultaneously occupied by multiple objects of the same kind.

$$\sum_{\substack{k: l=l(k), \\ i:k \in N(i)}} f_{ik}^{t-1} \leq 1, \sum_{\substack{k: l=l(k), \\ i:k \in N(i)}} g_{ik}^{t-1} \leq 1, \forall t, l. \quad (5)$$

Spatial Exclusion: As detailed in greater detail below, the processor 13 may model objects such as cars or people as rectangular cuboids, whose size is usually larger than that of a single grid cell. The processor 13 may impose spatial exclusion constraints to disallow solutions that contain overlapping cuboids in the 3D space. Let $N_f(k)$ and $N_g(k)$ denote the spatial exclusion neighborhoods for the containee and container objects respectively. We write $$\sum_{i:k \in N(i)} f_{ik}^{t-1} + \sum_{\substack{j \in N_f(k), \\ i:j \in N(i)}} f_{ij}^{t-1} \leq 1, \sum_{i:k \in N(i)} g_{ik}^{t-1} + \sum_{\substack{j \in N_g(k), \\ i:j \in N(i)}} g_{ij}^{t-1} \leq 1, \forall t, k. \quad (6)$$

Flow Conservation: the processor 13 may require the sum of the flows incoming to a graph vertex $fv_k^t$ to be equal to the sum of the outgoing flows for each container object type.

$$y_k^t = \sum_{i:k \in N(i)} g_{ik}^{t-1} = \sum_{j \in N(k)} g_{kj}^t, \forall t, k. \quad (7)$$

This ensures that the container objects cannot appear or disappear at locations other than the ones that are explicitly designated as entrances or exits. Graph vertices associated to these entrance and exit points serve respectively as a source and a sink for the flows. To allow this, the processor 13 may introduce two additional vertices $v_s$ and $v_n$ into the graph G, which are linked to all the vertices representing positions through which objects can respectively enter or leave the observed area. Furthermore, the processor 13 may add directed edges from $v_s$ to all the vertices of the first time instant and from all the vertices of the last time instant to $v_n$, as illustrated by FIGS. 3a and 3b.

Figure 3A:
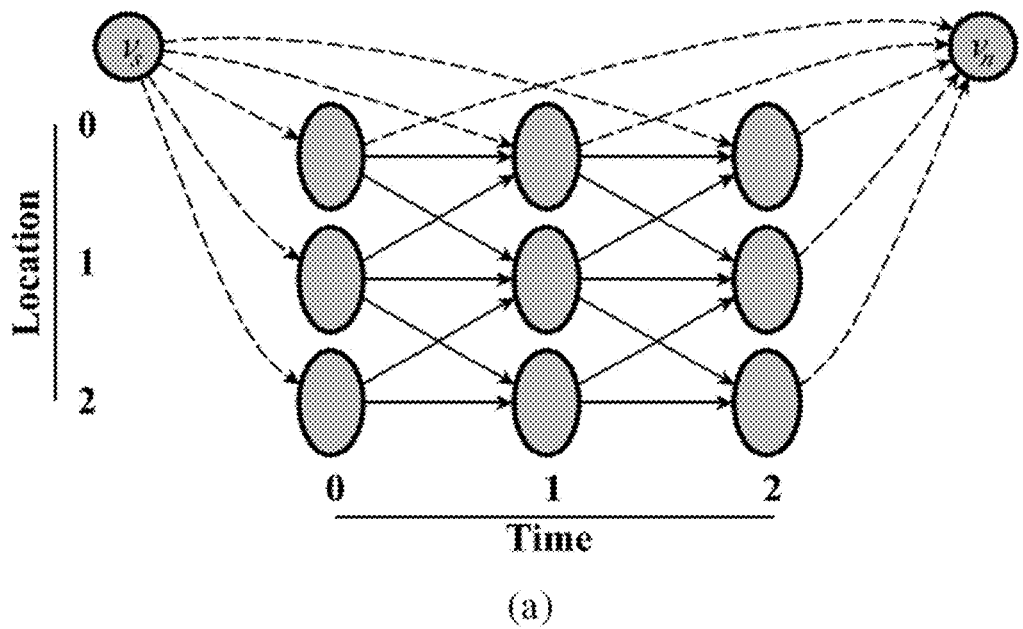
FIGS. 3a and 3b illustrate graphs representing 3 spatial locations at 3 consecutive times according to an embodiment of the invention.
Figure 3B:
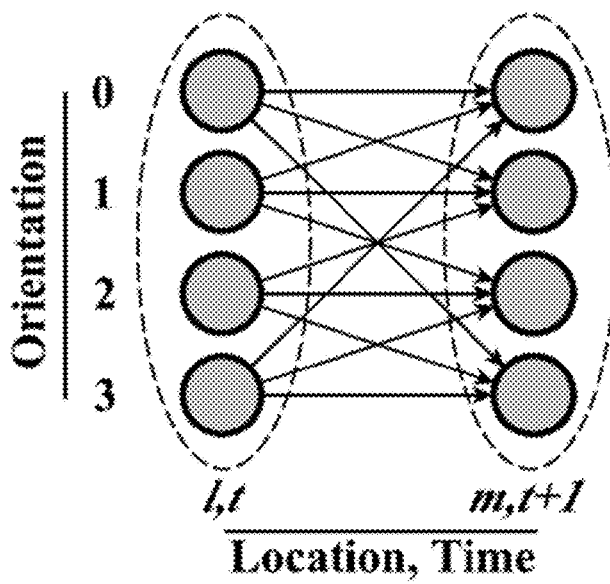

FIGS. 3a and 3b illustrate graphs representing 3 spatial locations at 3 consecutive times according to an embodiment of the invention. In FIG. 3a, each ellipse corresponds to one spatial location at one time instant. Some are connected to a source and a sink node to allow entrances and exits. In FIG. 3b, within each ellipse are four nodes, one for each possible orientation. The arrows represent possible transitions from one location and orientation to those in the neighboring ellipse.

To ensure that the total container flow is conserved in the system, the processor 13 may enforce the amount of flow generated at the source $v_s$ to be equal to the amount consumed at the sink $v_n$.

$$\sum_{j \in N(s)} g_{sj} = \sum_{i:n \in N(i)} g_{in}. \qquad (8)$$

Consistency of Interacting Flows: the processor 13 may allow a containee type object to appear or disappear at a location not designated as entrance or exit only when it comes into contact with or is separated from a container object. We write $$-\sum_{\substack{m:l(k)=l(m),\\i:m \in N(i)}} g_{im}^{t-1} \le a(t,k) \le \sum_{\substack{m:l(k)=l(m),\\j \in N(m)}} g_{mj}^{t}, \forall t, k \qquad (9)$$

$$a(t,k) = \sum_{i:k \in N(i)} f_{ik}^{t-1} - \sum_{j \in N(k)} f_{kj}^{t} \qquad (10)$$

In Eq. 9, the total amount of container flow passing through the location k is denoted by the two sums on both sides of the inequality. When they are zero, these constraints impose the conservation of flow for the containee objects at location k. When they are equal to one, a containee object can appear or disappear at k.

Note that all four sums in Eqs. 9 and 10 can be equal to one. As a result, these constraints allow for a container and a containee object to coexist at the same location and at the same time instant, which can give rise to several undesirable results as shown in the top row of FIG. 4.

Figure 4:
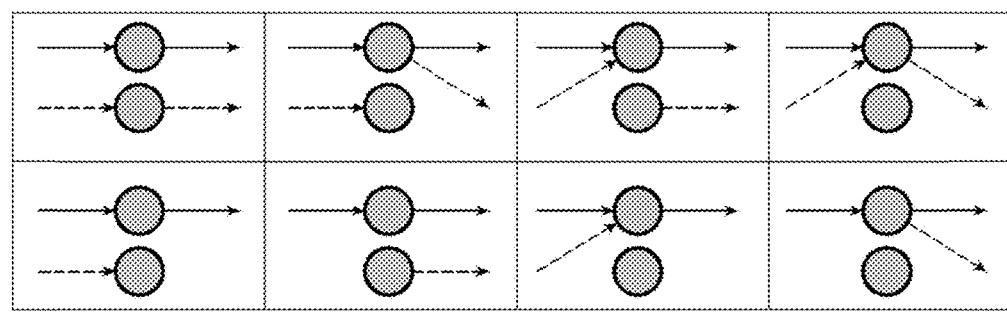
FIG. 4 illustrates flow constraints in a two-orientation tracking example according to an embodiment of the invention.

FIG. 4 illustrates flow constraints in a two-orientation tracking example according to an embodiment of the invention. In each of the eight examples shown here, the two circles represent two nodes at each spatial location, one for each orientation. The solid and the dotted arrows represent respectively non-zero flows $d_k^t$ and $f_{kj}^t$ of the container and of the visible containee objects. The top row illustrates forbidden configurations, which are all cases where a containee and a container coexist at the same location and at the same time instant without interacting with each other. For example, the configuration on the left could be interpreted as someone jumping in and out of the car at the same time. The bottom row illustrates feasible configurations.

To avoid forbidden configurations, the processor 13 may bound the total amount of containee flow incoming to and outgoing from a location by one when there is a container object at that location.

$$\sum_{\substack{k:l=l(k),\\i:k \in N(i)}} f_{ik}^{t-1} + \sum_{\substack{k:l=l(k)\\j \in N(k)}} f_{kj}^{t} \le 2 - \sum_{\substack{k:l=l(k)\\j \in N(k)}} g_{kj}^{t}, \forall t, l \qquad (11)$$

Tracking the Invisible: a containee object is said to be invisible when it is carried by a container. The four sets of constraints described above may not allow the processor 13 to keep track of the number of invisible instances carried by a container object at a time. To facilitate their tracking even when they are invisible, we introduce additional flow variables $h_{kj}^t$, which stand for the number of invisible containees moving from orientation o(k) and location l(k) at time t to orientation o(j) and location l(j) at time t+1. These variables act as counters that are incremented or decremented by the processor 13 when a containee object respectively disappears or appears in the vicinity of a container $$-\sum_{\substack{k:l=l(k)\\j \in N(k)}} h_{kj}^{t} = \sum_{\substack{k:l=l(k),\\i:k \in N(i)}} h_{ik}^{t-1} + \sum_{\substack{k:l=l(k),\\i:k \in N(i)}} f_{ik}^{t-1} - \sum_{\substack{k:l=l(k)\\j \in N(k)}} f_{kj}^{t}, \forall t, l \qquad (12)$$

$$h_{kj}^t \le c * g_{kj}^t, \forall t, k, j \qquad (13)$$

where c is a fixed integer constant standing for the maximum number of containee instances a container can hold. For example, in the case of cars and people, the processor 13 may set this constant to 5. As a result, unlike the flow variables $f_{kj}^t$ and $g_{kj}^t$ that are binary, and hence, bounded by one, these variables are continuous and usually have a higher but finite upper bound.

Additional Bound Constraints: the processor 13 may impose additional upper or lower bound constraints on the flow variables when the maximum or minimum number of object instances of a certain type in the scene is known a priori. For instance, during a basketball game, the number of balls in the court is bounded by one. We write this as $$\sum_{\substack{v_k^t \in V(t),\\j \in N(k)}} h_{kj}^{t} + \sum_{\substack{v_k^t \in V(t),\\j \in N(k)}} f_{kj}^{t} \le 1, \forall t \qquad (14)$$

where V(t) denotes the set of graph vertices of time instant t. Together with the invisible flow constraints expressed in Eqs. 12 and 13, these constraints allow the processor 13 to keep track of where the ball is and who has possession of it even when it is invisible. Another interesting case arises from the fact that a moving vehicle must have a driver inside. We express this as $$h_{kj}^t \ge g_{kj}^t, \forall t, k, j : l(k) \ne l(j) \qquad (15)$$

Mixed Integer Programming

The formulation defined above translates naturally into a Mixed Integer Program (MIP) with binary variables $f_{kj}^t$ and $g_{kj}^t$, continuous variables ht kj and a linear objective $$\sum_{\substack{t \in \{1,...,T\}, j \in N(k)\\v_k^t \in V(t)}} (\alpha_k^t f_{kj}^t + \gamma_k^t g_{kj}^t), \text{ with} \qquad (16)$$

$$\alpha_k^t = -\log\left(\frac{\rho_k^t}{1-\rho_k^t}\right), \text{ and } \gamma_k^t = -\log\left(\frac{\beta_k^t}{1-\beta_k^t}\right). \qquad (17)$$

This objective is to be minimized by the processor 13 subject to the constraints introduced in the previous section. Since there is a deterministic relationship between the occupancy variables ($x_k^t$; $y_k^t$) and the flow variables ($g_{kj}^t$; $g_{kj}^t$), this is equivalent to maximizing the expression of Eq. 4.

Solving the Linear Program (LP) obtained by relaxing the integrality constraints may, in some cases, result in fractional flow values as will be shown in the results section. That is why the processor 13 may explicitly enforce the integrality constraints in final results.

Graph Size Reduction

In many practical situations, the MIP of Eq. 16 has too many variables to be handled by many ordinary processors 13. To reduce the computational time, the processor 13 may eliminate spatial locations, whose probability of being occupied is very low. A naive way to do this may be to simply eliminate grid locations l(k) whose purely image-based probabilities $\rho_k^t$ and $\beta_k^t$ of being occupied by either a container or containee object are below a threshold. However, this may be self-defeating because it would preclude the algorithm from doing what it is designed to do, such as inferring that a car that was missed by the car detector must nevertheless be present because people are seen to be coming out of it.

Instead, the processor 13 may implement the following two-step algorithm. First, the processor 13 may designate all grid locations as potential entries and exits, and run a K-Shortest Paths Algorithm (KSP) to minimize the objective function introduced in Eq. 16 for containers and containees independently. Publicly available KSP code may be used by the processor 13. This produces a set of container and containee tracklets that can start and end anywhere and anytime on the grid. Second, the processor 13 may connect all these tracklets both to each other and to the original entrance and exit locations of the grid using the Viterbi algorithm. Finally, the processor 13 may consider the subgraph of G, whose nodes belong either to the tracklets or the paths connecting them.

In this way, the resulting subgraphs still contain the low $\rho_k^t$ and $\beta_k^t$ locations that may correspond to missed detections while being considerably smaller than the original grid graph. For example, on a 20-frame PETS2006 image sequence such as those described below, this procedure reduces the number of edges from around 22M to 17K. The resulting graphs are small enough to solve the MIP of Eq. 16 on batches of 500 to 1000 frames using the branch-and-cut procedure implemented in the Gurobi optimization library. This algorithm minimizes the gap between a lower bound obtained from LP relaxations and an upper bound obtained from feasible integer solutions. The algorithm stops when the gap drops below the specified tolerance value. In practice, the processor 13 may set the tolerance value to $1e^{-4}$ indicating the solution it finds is very close to the global optimum.

Estimating Probabilities of Occupancy

To use the processes described herein, the camera calibration information may be known a priori by the processor 13. Here, camera calibration refers to the internal and external parameters of a camera (e.g., sensor 11).

The processor 13 may also conduct discretization of the ground plane of the area of interest. Here, discretization refers to dividing of interest into square grids of the same size.

In order for the algorithms to work, the video capturing process may require the camera to be steady at least during the period of acquiring at least a single frame. Here, steady means that the camera should not be moved during the capturing process.

The algorithm discussed above may estimate such probabilities for pedestrians given the output of background subtraction on a set of images taken at the same time. Its basic ingredient is a generative model that represents humans as cylinders that the processor 13 may project into the images to create synthetic ideal images we would observe if people were at given locations. Under this model of the image given the true occupancy, the probabilities of occupancy at every location are taken to be the marginals of a product law minimizing the Kullback-Leibler divergence from the "true" conditional posterior distribution. This makes it possible to evaluate the probabilities of occupancy at every location as the fixed point of a large system of equations.

Probabilities computed in this way exhibit the property that allows the processor 13 to go from Eq. 1 to Eq. 2 in our derivation of the objective function the processor 13 may minimize. The approach described herein may therefore be extended to handling multiple classes of objects simultaneously as follows. A class is a type of object of the same nature, such as people, vehicle, or basketball. Generally, the processor 13 may define for the POM algorithm two classes of objects, which are the result of the processing by the POM of the input image data. The POM is a procedure which estimates the marginal probabilities of presence of individuals at every location in an area of interest under a simple appearance model, given binary images corresponding to the result of a background-subtraction from different viewpoints.

The appearance model is parameterized by a family of rectangles which approximate the objects and determining a class for the object detected at every location of interest, from every point of view.

Oriented Objects

Figure 5A:
FIGS. 5a and 5b illustrate simultaneous detection of people and cars according to an embodiment of the invention.
Figure 5B:
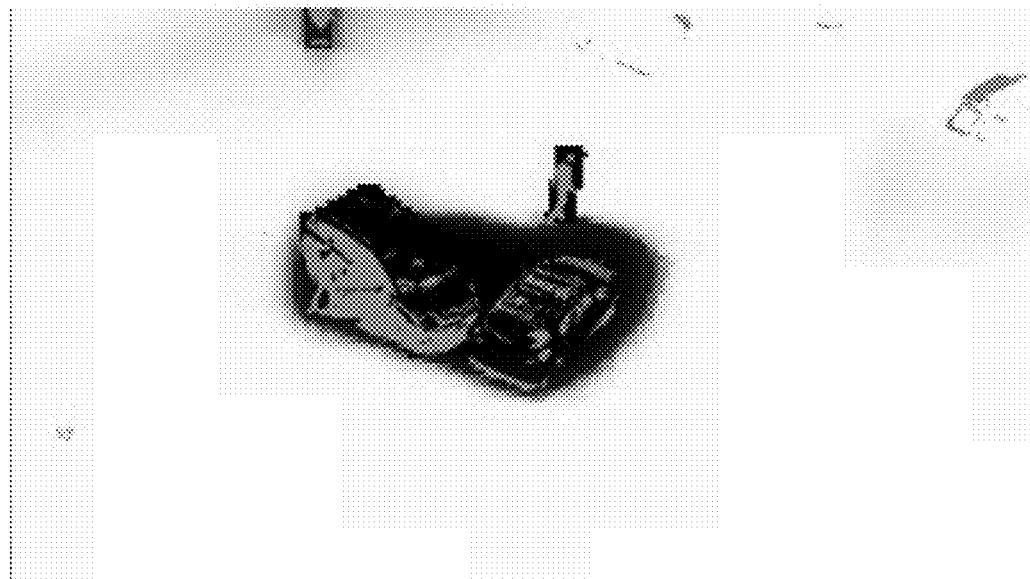
Figure 6A:
FIGS. 6a to 6f illustrate tracking results on three representative subsequences according to an embodiment of the invention.
Figure 6B:
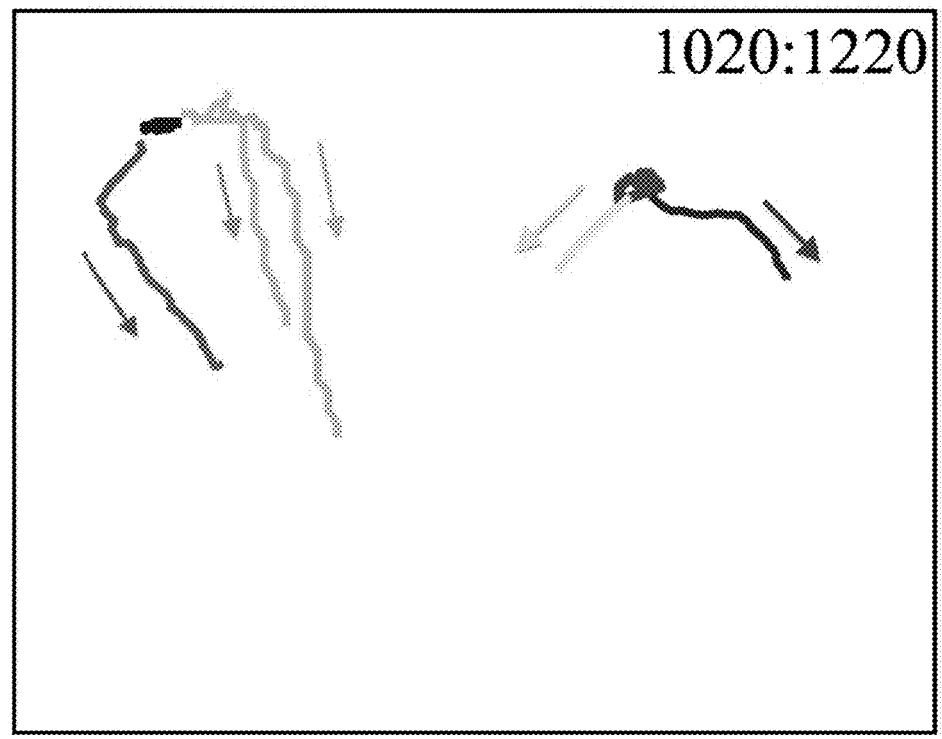
Figure 6C:
Figure 6D:
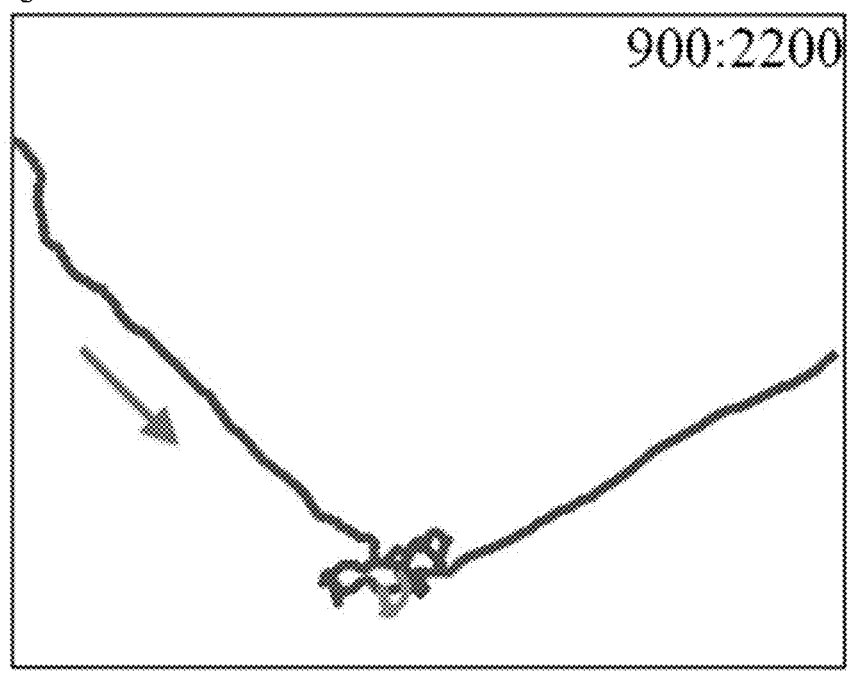
Figure 6E:
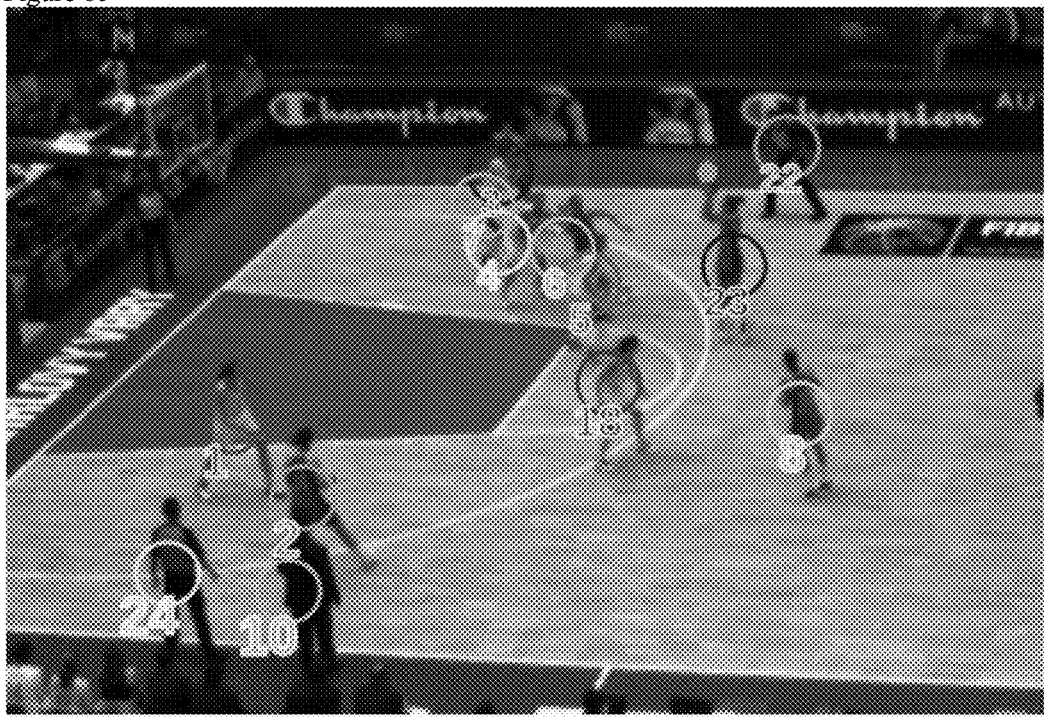
Figure 6F:
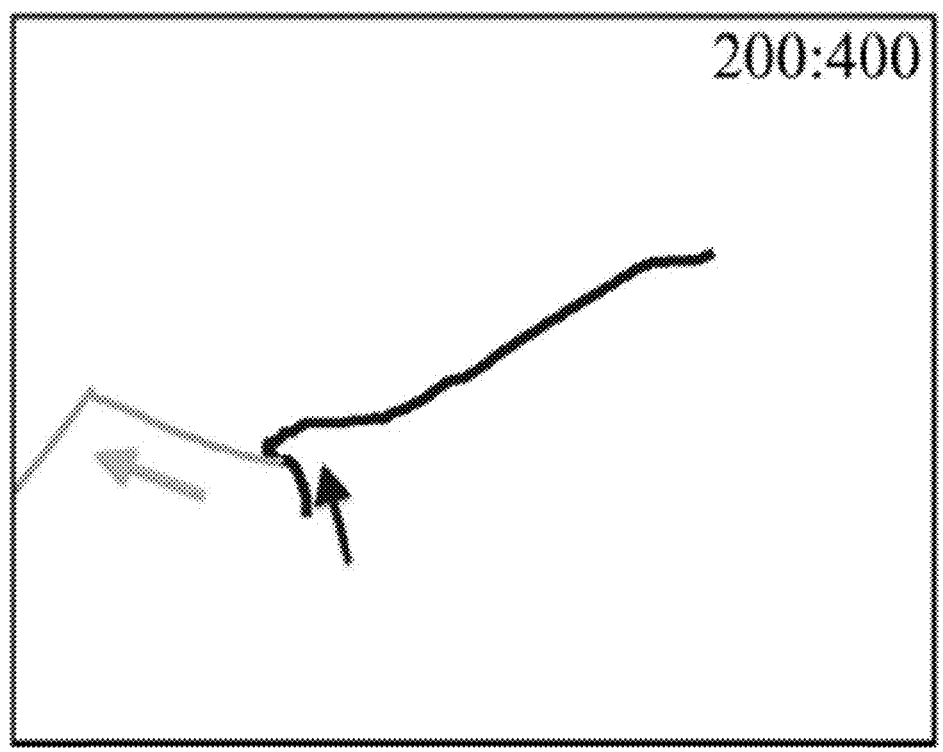

FIGS. 5a and 5b illustrate simultaneous detection of people and cars according to an embodiment of the invention. In FIG. 5a, a person and a car are detected by the processor 13, as indicated by the red and green wireframes. In FIG. 5b, the same boxes are projected and filled as black boxes by the processor 13 to create a synthetic image that approximates as closely as possible the background subtraction results, shown in green. Note that the white car is the same as the one that appears in FIGS. 2a to 2c. It remains undetected because the background subtraction algorithm fails to extract it.

In some embodiments, people are modeled as simple cylinders. To also handle objects such as cars or bags, the processor 13 may introduce simple wireframe models to represent them as well, as shown by the rectangular cuboids in FIGS. 5a and 5b. In the case of cylinders, orientation may be irrelevant, but the projections of the above-described wireframe models may depend on orientation. The processor 13 may solve this by allowing the generative model to use objects of any type at any one of the O regularly spaced orientations. The processor 13 may do this by computing the occupancy probability of an object of a particular class for each spatial location and orientation in each temporal image. For a scene with N spatial locations, O orientations and K different object classes, this results in a total of NOK occupancy probabilities for each image.

Since the projections of 3D models can have arbitrary shapes, the integral image trick of the publicly available software may not be useful in some embodiments. The processor 13 may therefore use an "integral line" variant, which is comparably efficient. More specifically, the processor 13 may compute an integral image by taking integral of the image values only along the horizontal axis.

At detection time, the processor 13 may then take the difference between the left-most and right-most integral pixels of a projected region and sum the resulting differences obtained from each row. Note that this approach is applicable to objects of non-convex shapes, such as a rectangle with a hole inside. This lets the processor 13 detect objects of different types simultaneously and compute the probabilities of occupancy $\rho_k^t$ and $\beta_k^t$ introduced above. Note that the white car in FIGS. 5a and 5b is missed because its color is too similar to that of the background. Arguably, the processor 13 may have used a more powerful car detector, but all detectors may sometimes fail. The techniques described herein can recover from such failures by leveraging information provided by other objects, in this case the people getting in or out of the car.

Objects Off the Ground Plane

In some cases, objects of interest may be assumed to be on the ground, and the fact that they can move in the vertical direction, such as when people jump, is ignored. For people, this is usually not an issue because the distance of their feet to the ground tends to be small compared to their total height and the generative model remains roughly correct. However, in the case of an object such as a ball, which is small and can be thrown high into the air, this is not true.

In theory, this could be handled by treating height over ground as a state variable, much as the processor 13 may do for orientation. However, in the specific case of the basketball competition, when the ball is in the air it is often is in front of the spectators, making the background non-constant, as discussed below. Thus, the results of treating height over ground as a state variable may be unsatisfactory.

Therefore, in this specific case and/or in other cases where height is of interest, the processor 13 may use a discriminative approach and run a ball detector (or other object detector) based on attributes such as color and roundness in each one of the frames taken at the same time, triangulate the 2D detections to obtain candidate 3D detections, and project the resulting probability estimate on the ground plane. Due to the small size of the ball compared to that of people, its presence or absence in a frame has little effect on the estimated probabilities of presence of people and, the processor 13 may assume conditional independence of presence of people and ball given the images, which means the processor 13 may still multiply the required probabilities as required for the derivation of Eq. 2.

Experiments

In this section, we first briefly describe the image sequences used in the described examples and then give some implementation details. We then introduce several baseline methods and finally present comparative results. We show that the approach described herein may outperform state-of-the-art methods on complex scenes with multiple interacting objects.

Test Sequences

The approach is applied to three datasets featuring three very different scenarios: people and vehicles on a parking lot (Car-People dataset), people and luggage in a railway station (PETS2001 dataset), and basketball players and the ball during a high-level competition (FIBA dataset). These datasets are multi-view, and the processor 13 processed a total of about 15K temporal frames to generate the described results. The datasets all involve multiple people and objects interacting with each other.

FIGS. 6a to 6f illustrate tracking results on these three representative subsequences according to an embodiment of the invention, showing one image from each dataset (6a, 6c, 6e) along with recovered trajectories for short sequences (6b, 6d, 6f). Sample frames 6a, 6c, and 6c have the detected container objects highlighted with circles and containee objects highlighted with dots. Corresponding color-coded top-view trajectories 6b, 6d, 6f, respectively, for interacting objects in the scene include arrows indicating the traversal direction. Note that, in the FIBA case (6e and 6f), even though there are many players in the field, the processor 13 may plot only two trajectories: one for the ball the other for the player first holding it and then throwing it.

Car-People Dataset (6a and 6b): the processor 13 captured several 300- to 5000-frame sequences from 2 cameras with up to 12 people interacting with 3 cars. The sequences feature many instances of people getting in and out of the cars. Here, experimental evaluation on two representative sequences is shown.

PETS2006 Dataset (6c and 6d): the processor 13 used a 3020-frame sequence acquired by two cameras that shows people entering and leaving a railway station while carrying bags. Notably, one person brings a backpack into the scene, puts it on the ground, and leaves.

FIBA Dataset (6e and 6f): the processor 13 used a 2600-frame sequence captured at the 2010 FIBA Women World Championship. 6 cameras were used to detect the people and the ball, 4 wide-angle cameras and 2 installed on the ceiling. The games feature two 5-player-teams, 3 referees, and 2 coaches. This sequence may be challenging due to the complex and frequent interactions between the players and the ball, which makes it hard to detect the ball. Pictures of the empty court may be used as additional input to the algorithm described above.

Parameters and Baselines

To compute the probabilities of occupancy $\rho_k^t$ and $\beta_k^t$, the processor 13 used 12 regularly distributed orientations for cars and 2 for luggages, which may be sufficient given the poor quality of the videos. For the outdoor scenes and the basketball court, the processor 13 discretized the ground plane into 25 cm×25 cm cells. For the railway station, the area of interest is relatively small, which allowed the processor 13 to perform a finer sampling with a cell size of 10 cm×10 cm to improve the localization accuracy.

We compared our approach, denoted as OURS-MIP, against six baseline methods, which we summarize below.

- POM: We consider those orientation nodes, for which one of the occupancy probabilities $p_k^t$ or $B_k^t$ is greater than 0.5, and suppress the others. The resulting detections lack temporal consistency and are not guaranteed to satisfy the constraints introduced above.
- SSP: The Successive Shortest Path (SSP) is a greedy algorithm for tracking multiple objects. It first builds a graph by linking pairs of object detections in consecutive temporal frames and then applies Dynamic Programming to find nearoptimal solutions. We run the publicly available SSP code on the image sequences described in the previous section and compared the results with ours.
- KSP-free: As discussed above, the KSP approach can be used to compute object trajectories for the container and containee objects independently using their occupancy probabilities. Recall that the processor 13 may designate all the grid locations as potential entries and exits prior to running the KSP algorithm. As a result, this approach allows objects to appear or disappear at any location at a certain cost value, which we take to be 40.
- KSP-fixed: This algorithm is similar to KSP-free, except that we use the original entrances and exits of the scene. Therefore, objects can only appear or disappear at these predetermined locations.
- KSP-sequential: We first use the KSP-fixed algorithm to track the container objects and designate all the nodes that belong to the resulting trajectories as potential entrances and exits for the containees. We then use the same algorithm to find the containee trajectories, which may emerge from or enter the container ones. In other words, unlike in our approach, the two object classes are not treated symmetrically.
- OURS-LP: The linear programming approach (LP) solves the problem introduced above with the integrality constraints relaxed. The resulting flow variables are then rounded to the nearest integer to obtain the final solution.

Results

FIGS. 7a-7d illustrate a comparison of the tracking approaches described herein to baseline tracking examples according to an embodiment of the invention. We ran all the baseline algorithms and ours on all the test sequences introduced above. As follows, we present quantitative results on a representative subset of the sequences.

To quantify these results, we use the standard CLEAR metrics, Multiple Object Detection Accuracy (MODA) and Multiple Object Tracking Accuracy and Precision (MOTA and MOTP). MODA focuses on missed and false detections, while MOTA also accounts for identity switches. They are defined as a function of the amount of overlap between the bounding boxes corresponding to the detections and the ground-truth.

In FIGS. 7a-7d, we plot MOTA and MODA for our approach (OURS-MIP) against those of our baselines on two sequences in the Car-People dataset, the PETS06 dataset, and the FIBA dataset.

Figures 7A, 7B:
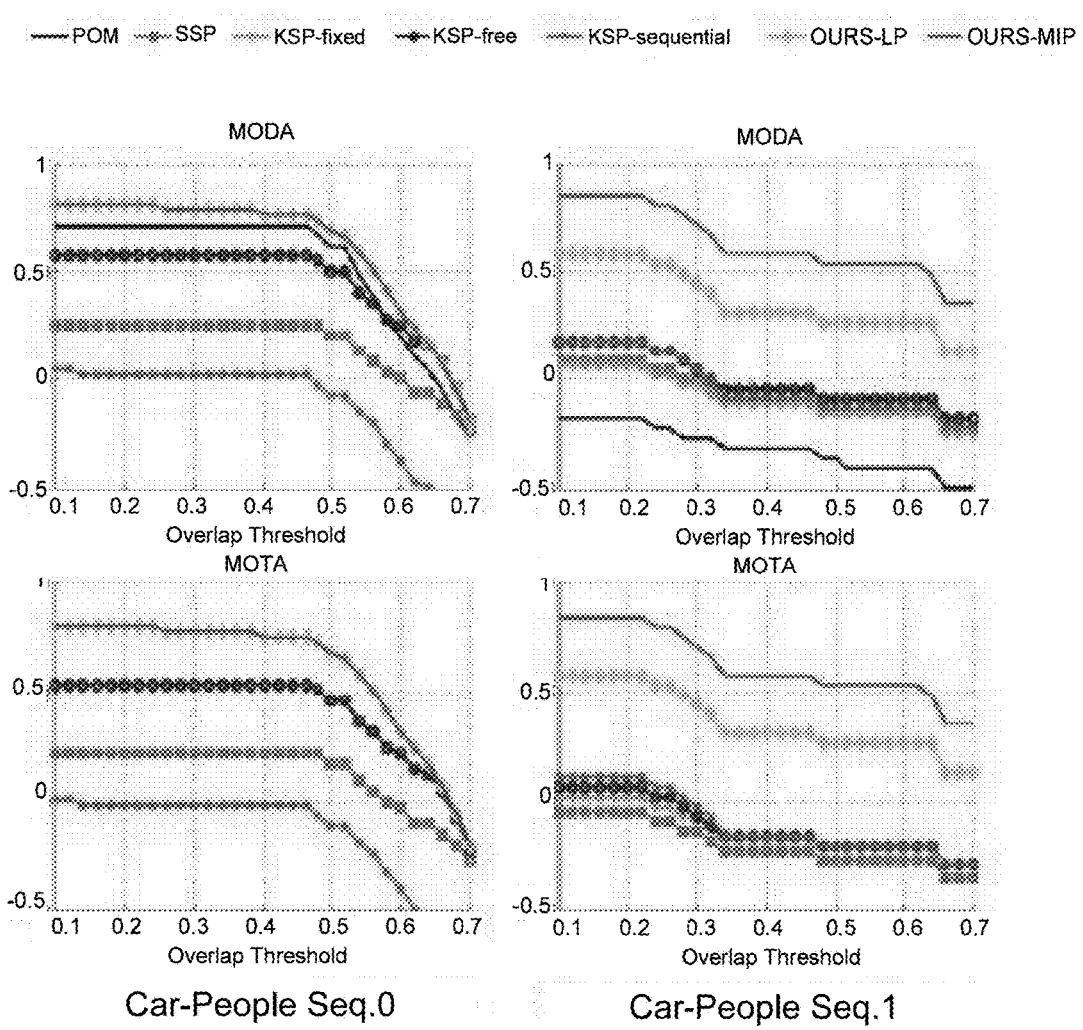
FIGS. 7a-7d illustrate a comparison of the tracking approaches described herein to baseline tracking examples according to an embodiment of the invention.

The sequence Car-People Seq.0 is the one from which we extracted the image shown in FIGS. 2a to 2c, and the corresponding results are shown in FIG. 7a. The image involves three people getting into a car stopped at the center of a parking lot. As discussed above, the POM detector often fails to detect the car due to poor background subtraction. As a result, both KSP-fixed and KSP-sequential yield poor results because they do not create a car track, and hence are forced to explain the people in the scene by hallucinating them entering from the edges of the field of view. SSP and KSP-free do better by allowing the car to appear and disappear as needed but this does not correspond to physically plausible behavior and POM does even better because the people are in fact detected most of the time. Our OURS-MIP approach performs best because the evidence provided by the presence of the people along with the constraint that they can only appear or disappear in the middle of the scene, where there is a stopped car, forces the algorithm to infer that there is one at the right place.

The Car-People Seq.1 sequence, shown in FIG. 7b, features two people getting into the first car, staying for a while, and getting out and entering the second one. Here, KSP-sequential and KSP-free do slightly better than KSP-fixed, which needs to hallucinate two false positive tracks to allow for the people emerging from the first car. The same happens in the PETS2006 sequence, shown in FIG. 7c, when the bag suddenly becomes visible in the middle of the image.

Again, our approach performs better than all the others mainly because we do not allow solutions that contain overlapping car or people detections in the 3D space, which is enforced by the spatial exclusion constraints discussed above. In contrast, all the baseline methods produce overlapping spurious detections that are not physically plausible.

Figures 7C, 7D:
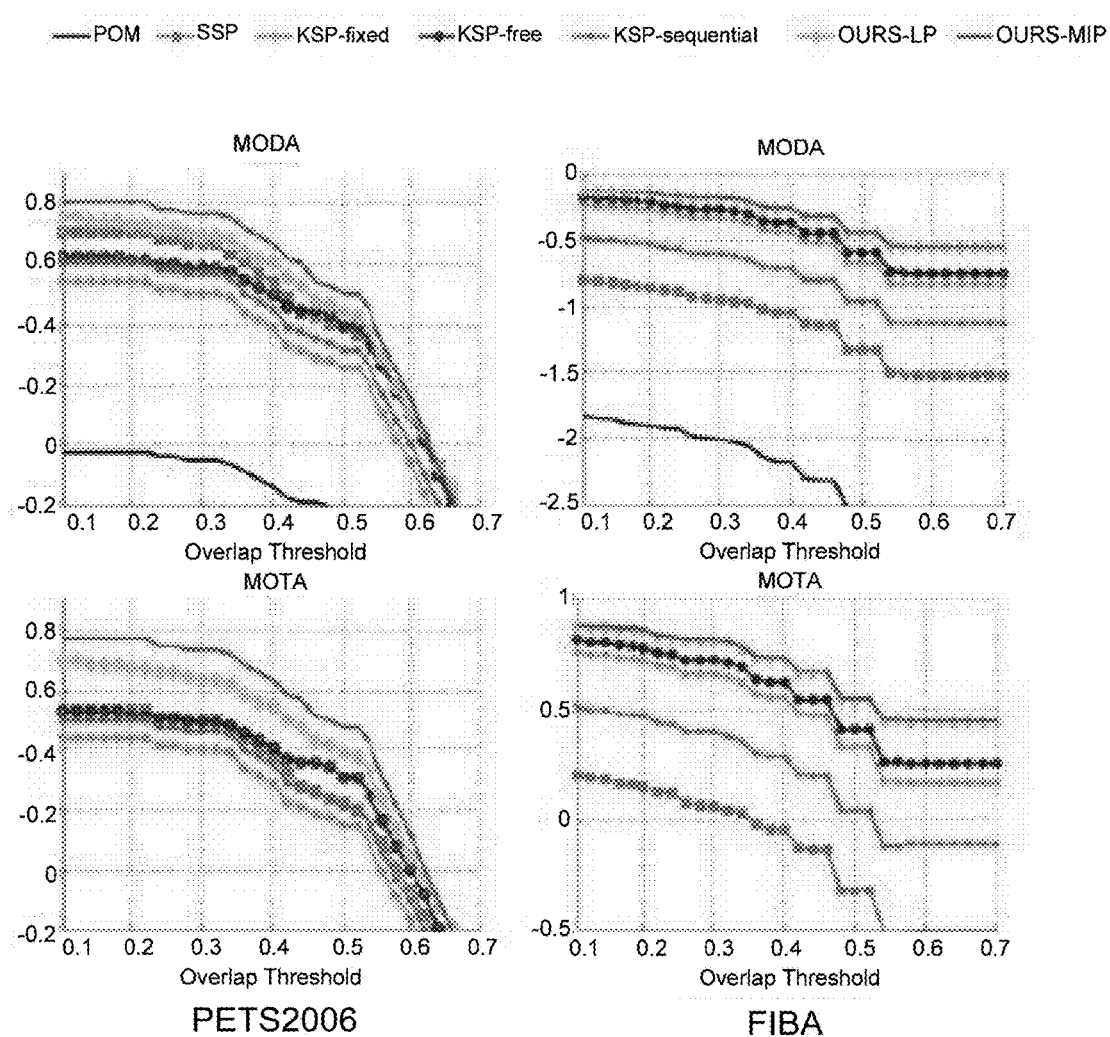

For the FIBA sequence, shown in FIG. 7d the MODA and MOTA scores for the ball only because the people detection scores for both the baselines and our approach are all very similar and the differences would not be visible in print. For the ball itself, however, they are. KSP-sequential performs worse than both KSP-fixed and KSP-free mainly because of the weak image evidence that gives rise to several spurious ball detections. KSP-fixed is able to eliminate some of these detections by forcing the ball to enter the scene only from the designated locations, and KSP-free by requiring that a cost to be paid for every appearance or disappearance of the ball. By contrast, we attempt to explain the whole scene at once by reasoning simultaneously for both players and ball, and enforcing that there can be at most one ball in the field during the game.

Finally, note that solving the LP problem discussed above and subsequently rounding the resulting fractional flow variables as in the OURS-LP baseline systematically performs either the same or worse than explicitly imposing the integrality constraints as we do in our complete OURS-MIP approach.

CONCLUSION

The systems and methods described herein utilize a new approach to tracking multiple objects of different types and accounting for their complex and dynamic interactions. The approach may use Integer Programming and may ensure convergence to a global optimum using a standard optimizer. Furthermore, not only does this approach explicitly handle interactions, it also provides an estimate for the implicit transport of objects for which the only evidence is the presence of other objects that can contain or carry them.

The described method is demonstrated herein on several real-world sequences that feature people boarding and getting out of cars, carrying and dropping luggages, and passing the ball during a basketball match. The same approach could be applied to simpler or more complex situations.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for tracking interacting objects comprising:
   acquiring, with at least one sensor, at least two images associated with at least two time instances;
   generating, with at least one processor, image data from the at least two images;
   applying, with the at least one processor, an extended Probability Occupancy Map (POM) algorithm to the image data to obtain probability of occupancy for a container class of potentially interacting objects, probability of occupancy for a containee class of the potentially interacting objects, and a size relationship of the potentially interacting objects, over a set of discrete locations on a ground plane for each time instance; and
   estimating, with the at least one processor, trajectories of at least one object belonging to each of the two classes by determining a solution of a tracking model on the basis of the occupancy probabilities and a set of rules describing the interaction between objects of different or the same classes, wherein estimating the trajectories comprises:
modeling, with the at least one processor, at least one transition, each transition being between a first one of the at least two images defining a first location with a first orientation of the at least one object, and a second one of the at least two images defining a second location with a second orientation of the at least one object, to produce a flow variable for each transition;
modeling, with the at least one processor, a set of rules that describes the interaction between objects of the same or different classes to allow physically-plausible interactions and disallow implausible interactions;
defining, with the at least one processor, an objective function in terms of a linear combination of each of the flow variables; and
solving, with the at least one processor, the objective function using at least one linear solver.

2. The method of claim 1, wherein an object classified within the container class or the containee class is a vehicle, a person, or an object that can be carried by a person.

3. The method of claim 1, wherein acquiring the at least two images comprises:
setting up at least one sensor around an area of interest;
generating, with the at least one processor, a camera calibration of the at least one sensor;
generating, with the at least one processor, a discretization of a ground surface of the area of interest into square grids each having a location, wherein each of the grids can be potentially occupied by the objects; and
keeping the cameras steady during each period of acquiring each of the at least two images.

4. The method of claim 3, wherein applying the POM algorithm comprises, for each time instance:
generating, with the at least one processor, a background subtraction from the image data and obtaining a binary image; and
generating, with the at least one processor, a probability for the object occupying a specific square grid location with a specific orientation.

5. The method of claim 4, wherein applying the POM algorithm further comprises:
for each class, initializing, with the at least one processor, a template of an object comprising a probability of a specific location with a specific orientation into the square grid;
for each template in the area of interest, generating, with the at least one processor, a probability of a presence of the object.

6. The method of claim 1, wherein modeling the at least one transition comprises:
for each object of one of the classes at the first location with the first orientation, determining, with the at least one processor, a possible transition neighborhood of the object in the second image; and
modeling, with the at least one processor, the transition of each object to each determined neighborhood with a flow variable.

7. The method of claim 1, wherein the set of rules comprises:
for objects of the same class, a same spatial location cannot be occupied by more than one object;
the container object can only appear or disappear at the edge of the area of interest;
the containee object can appear or disappear at the locations of a container object or at the edge of the area of interest; and
a maximum number of instances of the object among the area of interest.

8. The method of claim 1, wherein the at least one sensor comprises at least one camera.

9. A system for tracking interacting objects comprising:
at least one sensor configured to acquire at least two images associated with at least two time instances; and
at least one processor in communication with the at least one sensor and configured to:
generate image data from the at least two images;
apply an extended Probability Occupancy Map (POM) algorithm to the image data to obtain probability of occupancy for a container class of potentially interacting objects, probability of occupancy for a containee class of the potentially interacting objects, and a size relationship of the potentially interacting objects, over a set of discrete locations on a ground plane for each time instance; and
estimate trajectories of at least one object belonging to each of the two classes by determining a solution of a tracking model on the basis of the occupancy probabilities and a set of rules describing the interaction between objects of different or the same classes,
wherein the at least one processor is configured to estimate the trajectories by:
modeling at least one transition, each transition being between a first one of the at least two images defining a first location with a first orientation of the at least one object, and a second one of the at least two images defining a second location with a second orientation of the at least one object, to produce a flow variable for each transition;
modeling a set of rules that describes the interaction between objects of the same or different classes to allow physically-plausible interactions and disallow implausible interactions;
defining an objective function in terms of a linear combination of each of the flow variables; and
solving, with the at least one processor, the objective function using at least one linear solver.

10. The system of claim 9, wherein an object classified within the container class or the containee class is a vehicle, a person, or an object that can be carried by a person.

11. The system of claim 9, wherein acquiring the at least two images comprises:
setting up at least one sensor around an area of interest;
generating a camera calibration of the at least one sensor;
generating a discretization of a ground surface of the area of interest into square grids each having a location, wherein each of the grids can be potentially occupied by the objects; and
keeping the cameras steady during each period of acquiring each of the at least two images.

12. The system of claim 11, wherein the at least one processor is configured to apply the POM algorithm, for each time instance, by:
generating a background subtraction from the image data and obtaining a binary image; and
generating a probability for the object occupying a specific square grid location with a specific orientation.

13. The system of claim 12, wherein the at least one processor is further configured to apply the POM algorithm by:

for each class, initializing a template of an object comprising a probability of a specific location with a specific orientation into the square grid;

for each template in the area of interest, generating a probability of a presence of the object.

14. The system of claim 9, wherein the at least one processor is configured to model the at least one transition comprises:

for each object of one of the classes at the first location with the first orientation, determining a possible transition neighborhood of the object in the second image; and modeling the transition of each object to each determined neighborhood with a flow variable.

15. The system of claim 9, wherein the set of rules comprises:

for objects of the same class, a same spatial location cannot be occupied by more than one object;

the container object can only appear or disappear at the edge of the area of interest;

the containee object can appear or disappear at the locations of a container object or at the edge of the area of interest; and a maximum number of instances of the object among the area of interest.

16. The system of claim 9, wherein the at least one sensor comprises at least one camera.

* * * * *